United States Patent
Grant et al.

(10) Patent No.: US 11,102,064 B2
(45) Date of Patent: Aug. 24, 2021

(54) DYNAMICALLY ADAPTING AN INTERNET OF THINGS (IOT) DEVICE

(71) Applicant: International Business Machines Corporation, Armonk, NY (US)

(72) Inventors: Robert H. Grant, Atlanta, GA (US); Zachary A. Silverstein, Austin, TX (US); Sarbajit K. Rakshit, Kolkata (IN); Connor J. Matthews, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/553,584

(22) Filed: Aug. 28, 2019

(65) Prior Publication Data
US 2021/0067411 A1  Mar. 4, 2021

(51) Int. Cl.
H04L 12/24 (2006.01)
H04L 12/26 (2006.01)
H04L 29/08 (2006.01)

(52) U.S. Cl.
CPC ...... *H04L 41/0816* (2013.01); *H04L 41/0883* (2013.01); *H04L 43/16* (2013.01); *H04L 67/12* (2013.01)

(58) Field of Classification Search
CPC . H04L 41/0816; H04L 41/0883; H04L 43/16; H04L 67/12
See application file for complete search history.

(56) References Cited

U.S. PATENT DOCUMENTS

| 8,375,118 B2 | 2/2013 | Hao et al. |
| 9,292,832 B2 | 3/2016 | Goel et al. |

(Continued)

FOREIGN PATENT DOCUMENTS

| CN | 202735830 U | 2/2013 |
| CN | 104813378 A | 7/2015 |
| CN | 105867158 A | 8/2016 |

OTHER PUBLICATIONS

Bruce H. Dobkin, "Wearable motion sensors to continuously measure real-world physical activities", https://www.ncbi.nlm.nih.gov/pmc/articles/PMC4035103/, Dec. 1, 2014, 13 pages.

(Continued)

*Primary Examiner* — Blake J Rubin
(74) *Attorney, Agent, or Firm* — William H. Hartwell; Hunter E. Webb; Keohane & D'Alessandro, PLLC

(57) ABSTRACT

Aspects of the present invention provide an approach for dynamically adapting an Internet of Things (IOT) device in an existing intelligent system. In an embodiment, in response to a new IOT device being added to an intelligent system, a replacement score is determined for each existing IOT device in the system. The replacement score for a given existing IOT device can indicate: (i) an amount of overlapping capabilities between the existing IOT device and the new IOT device, (ii) an amount of additional capabilities of the new IOT device over the existing IOT device, (iii) an amount of performance improvement of the new IOT device over the existing IOT device, and/or the like. In response to the replacement score for an existing IOT device exceeding a predefined threshold, a proposed reconfiguration of the existing intelligent system is generated.

20 Claims, 4 Drawing Sheets

(56) References Cited

U.S. PATENT DOCUMENTS

| | | | |
|---|---|---|---|
| 9,473,321 B1 | 10/2016 | Bazar et al. | |
| 10,262,019 B1* | 4/2019 | Reiner | G06F 11/079 |
| 10,447,683 B1* | 10/2019 | Loladia | H04W 4/70 |
| 10,904,086 B1* | 1/2021 | Varia | G06F 9/4401 |
| 2013/0159479 A1* | 6/2013 | Vasseur | H04L 45/38 |
| | | | 709/221 |
| 2014/0244833 A1* | 8/2014 | Sharma | H04L 12/281 |
| | | | 709/224 |
| 2014/0244834 A1* | 8/2014 | Guedalia | H04W 4/21 |
| | | | 709/224 |
| 2015/0019710 A1 | 1/2015 | Shaashua et al. | |
| 2015/0036881 A1* | 2/2015 | Sharma | G06F 16/50 |
| | | | 382/103 |
| 2016/0065653 A1 | 3/2016 | Chen et al. | |
| 2016/0112487 A1* | 4/2016 | Wang | H04L 65/605 |
| | | | 709/201 |
| 2016/0261458 A1* | 9/2016 | Huang | H04L 67/12 |
| 2016/0323143 A1* | 11/2016 | Kim | G06F 3/0629 |
| 2016/0328719 A1* | 11/2016 | Ananchaperumal | H04W 4/70 |
| 2016/0342906 A1* | 11/2016 | Shaashua | H04L 67/22 |
| 2017/0052688 A1* | 2/2017 | Evans | G06F 16/21 |
| 2017/0093593 A1* | 3/2017 | Yang | H04L 12/2818 |
| 2017/0237804 A1* | 8/2017 | Baughman | H04L 67/10 |
| | | | 709/201 |
| 2018/0006899 A1* | 1/2018 | Ogrinz | H04L 43/0817 |
| 2018/0048987 A1* | 2/2018 | Morris | H04W 4/50 |
| 2018/0109650 A1* | 4/2018 | Berdy | G06F 21/305 |
| 2018/0146041 A1* | 5/2018 | Moustafa | H04L 67/2876 |
| 2018/0211176 A1* | 7/2018 | Khurshudov | H04W 4/70 |
| 2018/0234318 A1* | 8/2018 | Cox | H04L 43/0823 |
| 2018/0234489 A1* | 8/2018 | Hammons | H04L 67/12 |
| 2018/0254997 A1* | 9/2018 | Clarke | H04L 41/12 |
| 2018/0293387 A1 | 10/2018 | Bar-El et al. | |
| 2018/0309639 A1* | 10/2018 | Birkner | H04L 41/16 |
| 2018/0332117 A1* | 11/2018 | Street | H04L 41/0806 |
| 2018/0375720 A1* | 12/2018 | Yang | G06N 20/00 |
| 2019/0089603 A1* | 3/2019 | Harat | H04W 72/048 |
| 2019/0108353 A1* | 4/2019 | Sadeh | G06F 21/604 |
| 2019/0113899 A1* | 4/2019 | Jeong | G05B 15/02 |
| 2019/0140933 A1* | 5/2019 | Guim Bernat | H04L 43/08 |
| 2019/0141132 A1* | 5/2019 | Yoo | H04B 1/385 |
| 2019/0288913 A1* | 9/2019 | Salgueiro | H04L 41/082 |
| 2019/0339688 A1* | 11/2019 | Celia | G05B 23/024 |
| 2019/0349426 A1* | 11/2019 | Smith | H04L 67/104 |
| 2019/0370687 A1* | 12/2019 | Pezzillo | G06N 20/00 |
| 2019/0372710 A1* | 12/2019 | Chen | H04W 72/04 |
| 2020/0026787 A1* | 1/2020 | Alam | G06F 9/542 |
| 2020/0067787 A1* | 2/2020 | Patra | H04W 4/70 |
| 2020/0117384 A1* | 4/2020 | Ripplinger | G06F 16/182 |
| 2020/0151619 A1* | 5/2020 | Mopur | G06N 20/00 |
| 2020/0162556 A1* | 5/2020 | Wood | H04L 29/08 |
| 2020/0227024 A1* | 7/2020 | Rozen | G10L 19/00 |
| 2020/0285891 A1* | 9/2020 | Yellin | G06K 9/6227 |

OTHER PUBLICATIONS

Timo Sztyler et al., "Position-aware activity recognition with wearable devices", Pervasive and Mobile Computing 38, 2017, pp. 281-295.

Matsumoto et al., "A Posture Detection System using Consumer Wearable Sensors", 2016 10th International Conference on Complex, Intelligent, and Software Intensive Systems, Copyright 2016 IEEE, pp. 526-531.

Yong-Ting Wang et al., "Real-Time Continuous Gesture Recognition with Wireless Wearable IMU Sensors", 2018 IEEE 20th International Conference on e-Health Networking, Applications and Services (Healthcom), Copyright 2018 IEEE, 6 pages.

Nabeel Siddiqui et al., "A Wearable Hand Gesture Recognition Device Based on Acoustic Measurements at Wrist", Copyright 2017 IEEE, pp. 4443-4446.

* cited by examiner

DYNAMICALLY ADAPTING AN INTERNET OF THINGS (IOT) DEVICE

TECHNICAL FIELD

The subject matter of this invention relates generally to system configuration. More specifically, aspects of the present invention provide a solution that dynamically adapts an Internet of Things (IOT) device in an existing intelligent system.

BACKGROUND

The Internet of Things (IOT) refers to the connecting of computing devices (IOT devices). The IOT devices may be uniquely identifiable and may communicate with one or more other IOT devices via computing networks to form device configurations. IOT is based on the idea that everyday objects, not just computers and computer networks, can be readable, recognizable, locatable, addressable, and/or controllable via an IOT communications network (e.g., an ad-hoc system or the Internet). A number of market trends are driving development of IOT devices. For example, increasing health care costs and aging populations are driving development for remote/connected health care and fitness services. A technological revolution in the home is driving development for new "smart" services, including consolidation by service providers marketing IV' play (e.g., data, voice, video, security, energy management, etc.) and expanding home networks.

Many IOT devices leverage Wi-Fi technology to link them together, as well as, in some cases, connecting to wireless access points that may in turn connect to the web and/or cloud-based intelligence. When a new IOT device is brought into an existing network, it often connects to a form of a centralized network, such as a central home intelligent system or virtual agent. Each IOT device is brought in to add new functionality, to augment already existing IOT functionality, and/or to extend interaction capabilities. The introduction of these can often create redundancies in functionality.

SUMMARY

In general, aspects of the present invention provide an approach for dynamically adapting an Internet of Things (IOT) device in an existing intelligent system. In an embodiment, in response to a new IOT device being added to an intelligent system, a replacement score is determined for each existing IOT device in the system. The replacement score for a given existing IOT device can indicate: (i) an amount of overlapping capabilities between the existing IOT device and the new IOT device, (ii) an amount of additional capabilities of the new IOT device over the existing IOT device, (iii) an amount of performance improvement of the new IOT device over the existing IOT device, and/or the like. In response to the replacement score for an existing IOT device exceeding a predefined threshold, a proposed reconfiguration of the existing intelligent system is generated.

One aspect of the invention provides a computer-implemented method dynamically adapting an Internet of Things (IOT) device in an existing intelligent system, comprising: receiving, upon introduction of a new IOT device to the intelligent system, product attribute data of the new IOT device; monitoring, for a predefined amount of time, performance data of the new IOT device; generating, based on a comparison of the product attribute data and performance data maintained in a database of an existing IOT device and the new IOT device, a replacement score for the existing IOT device; and generating, when the replacement score of the existing IOT device exceeds a predefined threshold, a proposed reconfiguration of the existing intelligent system.

Another aspect of the present invention includes a computer system for dynamically adapting an IOT device in an existing intelligent system, the computer system comprising: a memory medium comprising program instructions; a bus coupled to the memory medium; and a processor for executing the program instructions, the instructions causing the system to: receive, upon introduction of a new IOT device to the intelligent system, product attribute data of the new IOT device; monitor, for a predefined amount of time, performance data of the new IOT device; generate, based on a comparison of the product attribute data and performance data maintained in a database of an existing IOT device and the new IOT device, a replacement score for the existing IOT device; and generate, when the replacement score of the existing IOT device exceeds a predefined threshold, a proposed reconfiguration of the existing intelligent system.

Yet another aspect of the invention provides a computer program product embodied in a computer readable medium that, when executed by a computer device, performs a method for dynamically adapting an IOT device in an existing intelligent system, the method comprising: receiving, upon introduction of a new IOT device to the intelligent system, product attribute data of the new IOT device; monitoring, for a predefined amount of time, performance data of the new IOT device; generating, based on a comparison of the product attribute data and performance data maintained in a database of an existing IOT device and the new IOT device, a replacement score for the existing IOT device; and generating, when the replacement score of the existing IOT device exceeds a predefined threshold, a proposed reconfiguration of the existing intelligent system.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
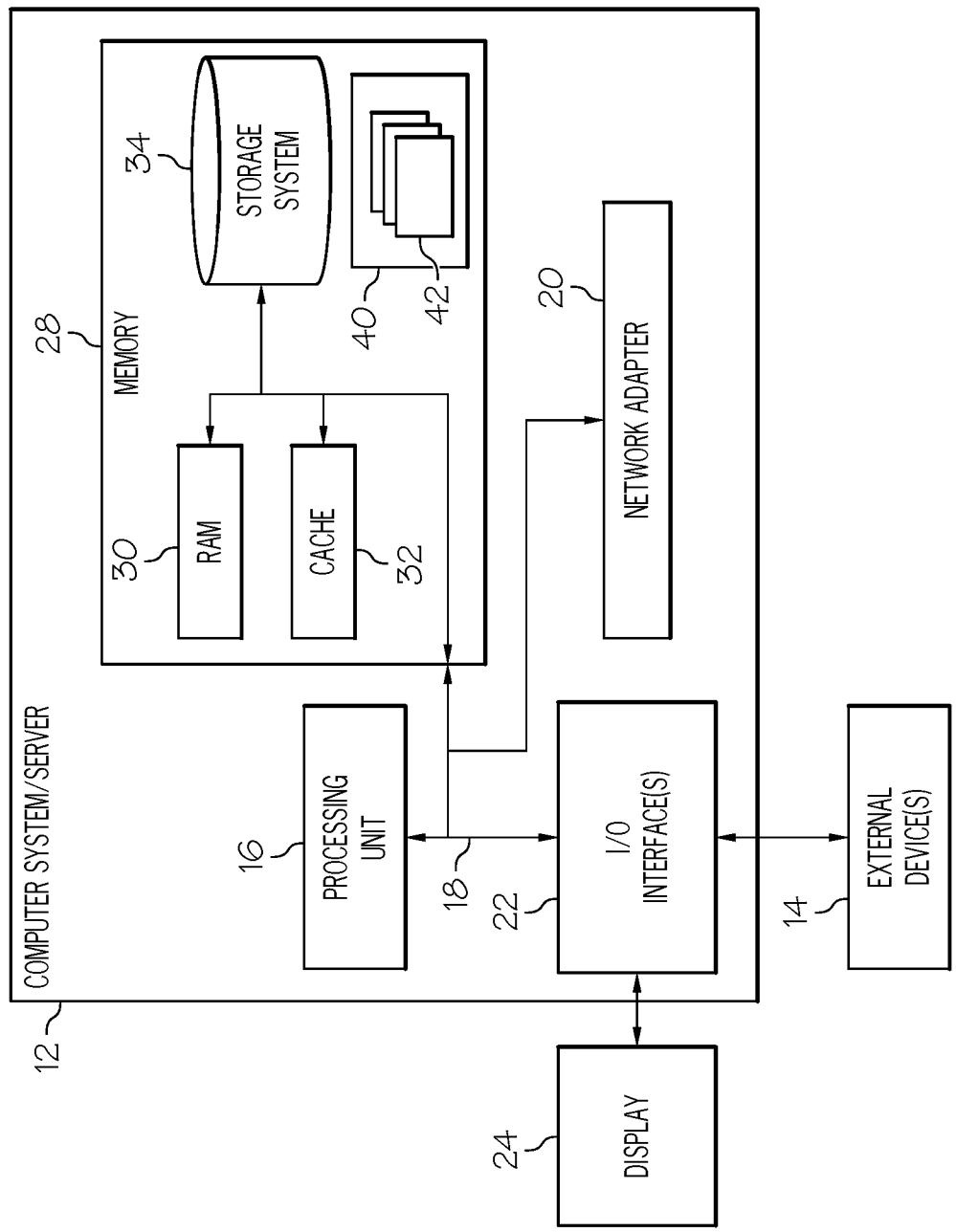
FIG. 1 depicts a data processing system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for dynamically adapting an IOT device in an existing intelligent system. In an embodiment, in response to a new IOT device being added to an intelligent system, a replacement score is determined for each existing IOT device in the system. The replacement score for a given existing IOT device can indicate: (i) an amount of overlapping capabilities between the existing IOT device and the new IOT device, (ii) an amount of additional capabilities of the new IOT device over the existing IOT device, (iii) an amount of performance improvement of the new IOT device over the existing IOT device, and/or the like. In response to the replacement score for an existing IOT device exceeding a predefined threshold, a proposed reconfiguration of the existing intelligent system is generated.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
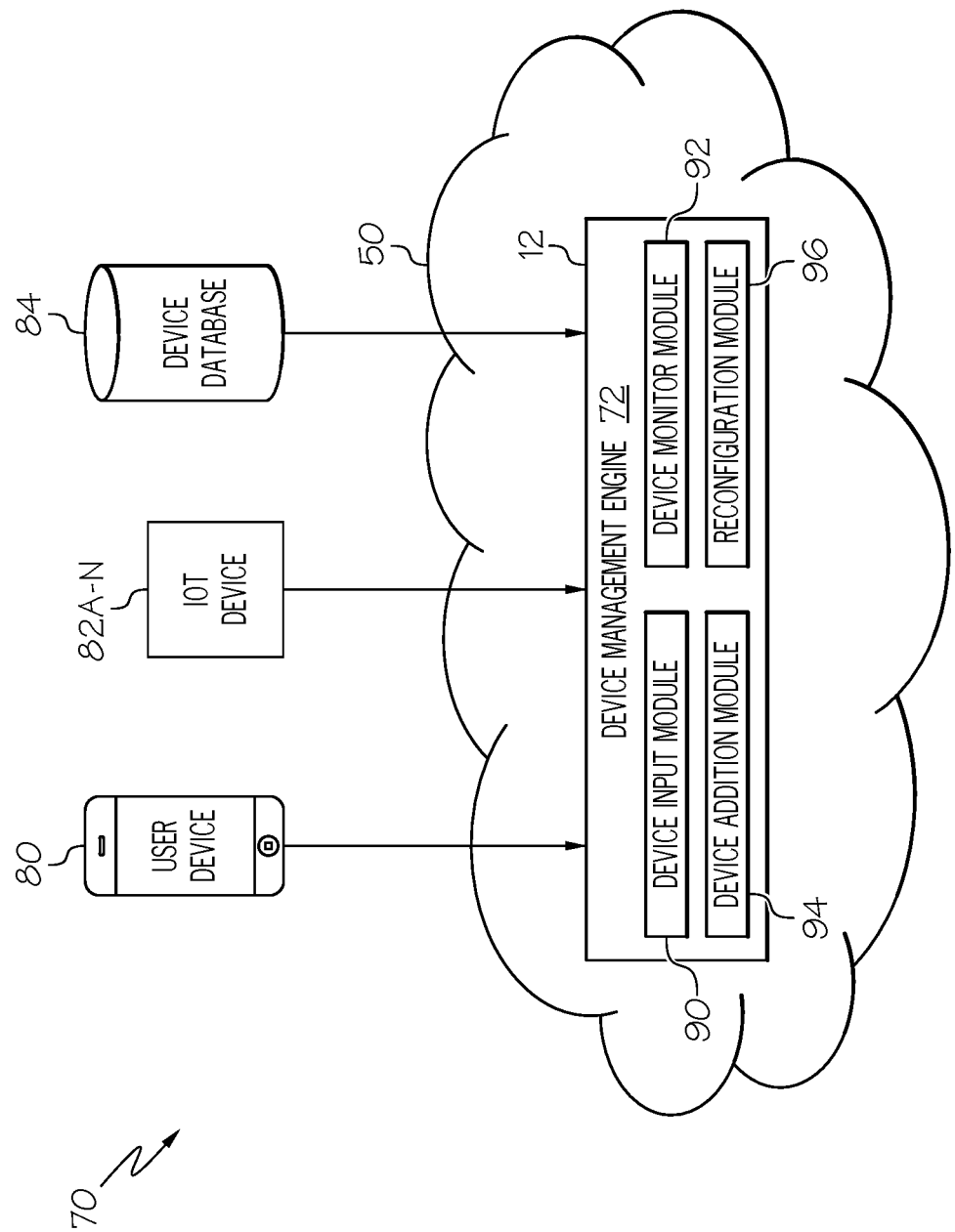
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each user device 80 need not have a device management engine (hereinafter "system 72"). Rather, system 72 could be loaded on a server or server-capable device that communicates (e.g., wirelessly) with user device 80 to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to processing of audio/visual information (e.g., in a cognitive and/or network computing environment). Such other system(s) have not been shown in FIG. 2 for brevity purposes.

Along these lines, system 72 may perform multiple functions similar to a general-purpose computer. Specifically, among other functions, system 72 can provide a solution that dynamically adapts an Internet of Things (IOT) device in an existing intelligent system. To accomplish this, system 72 can include: a device input module 90, a device monitor module 92, a device addition module 94, and a reconfiguration module 96. System 72 is configured to communicate with user device 80 and any number of IOT devices 82A-N within a smart environment, as discussed in detail below.

Currently, the world is experiencing a dramatic rise in the number of IOT devices used in industrial and private environments. The work environment, the home environment, a public building, city street equipment (e.g., illumination), etc., are increasingly equipped with devices which are able to connect to each other and perform specific functions. These devices often perform the same functions as they are often designed and produced from different companies but address similar problems (e.g., smart building IOT devices). Thus, a plurality of different devices from different vendors may perform comparable tasks which may render a particular IOT device redundant, wasting resources such as communications bandwidth and processor time.

The current embodiments solve these and/or other problems in the current solutions by identifying a functionality redundancy between an existing IOT device and a newly introduced IOT device in an intelligent system. When a new intelligent device is connected to an existing home intelligent system, the new device needs to be configured. The new device is expected to solve a specific problem of a user or add a new feature which helps the user perform an activity in a better manner. The new device can have a functionality or feature that existing devices might also have. In some instances, the new device might produce a better quality of output for a particular functionality than one or more existing devices. As such, an existing device or a portion of the functionality of an existing device might be rendered redundant. A solution is needed that can generate a proposed reconfiguration of devices for a user that an IOT device or functionality has become redundant upon introduction of the new IOT device.

Referring again to FIG. 2, device input module 90 of system 72, as executed by computer system/server 12, is configured to receive product attribute data for each IOT device in the intelligent system. Example product attribute can include, but is not limited to, brand, model, fault tolerances, features, capabilities, and/or the like. Fault tolerant technology relates to a capability of an IOT device to deliver uninterrupted service, despite one or more of its components failing. Different devices can have completely different capabilities and serve completely different functions.

IOT devices can generally be categorized into three main groups: consumer, enterprise, and industrial. Consumer connected devices include smart TVs, smart speakers, toys, wearables, and smart appliances. Smart meters, commercial security systems, and smart city technologies, such as those used to monitor traffic and weather conditions, are examples of industrial and enterprise IOT devices. Other technologies, including smart air conditioning, smart thermostats, smart lighting and smart security, span home, enterprise, and industrial uses.

In a smart home, for example, a user arrives home and his car communicates with the garage to open the door. Once inside, the thermostat is already adjusted to his preferred temperature, and the lighting is set to a lower intensity and his chosen color for relaxation, as his pacemaker data indicates it has been a stressful day. While for purposes of simplicity of explanation, examples discussed herein relate to smart home uses, it is to be understood and appreciated that the claimed subject matter is not limited to this context. The present disclosure may be employed in a variety of applications including enterprise and/or industrial uses. In the smart home example above, device input module 90 receives product attribute data for the garage door, thermostat, lighting, and pacemaker.

Typically, device input module 90 receives product attribute data (or metadata) for a particular IOT device when the device is introduced into (or added to) the intelligent system. An intelligent system can consist of any number of IOT devices that can communicate with one another to exchange information about planned state transitions or other suitable decisions in order to make decisions in a collaborative and intelligent manner. In an embodiment, the product attribute data can be input into device input module 90 by a user via an interface. In another embodiment, the product attribute data can be automatically detected by device input module 90 when the IOT device is introduced. In an embodiment, upon receiving product attribute data for an IOT device, device input module 90 can be further configured to store the product attribute data in device database 84. Device database 84 can use any type of database structure (e.g., relational, hierarchical, etc.) to store product attribute data for any number of existing IOT devices in an intelligent system.

Device monitor module 92 of system 72, as executed by computer system/server 12, is configured to monitor performance data of each IOT device in an intelligent system. Performance data can include, but is not limited to, actual fault tolerances, error rates, usage patterns, execution logs, outputs, and/or any other type of data indicative of device performance. In an embodiment, performance data can be stored in device database 84. IOT devices produce data continuously. This data can be saved and analyzed for future decision making, such as identifying any device or functionality redundancy.

Device addition module 94 of system 72, as executed by computer system/server 12, is configured to generate a replacement score for each existing IOT device in an existing intelligent system. The replacement score for a given existing IOT device can indicate: (i) an amount of overlapping capabilities between the existing IOT device and the new IOT device, (ii) an amount of additional capabilities of the new IOT device over the existing IOT device, (iii) an amount of performance improvement of the new IOT device over the existing IOT device, and/or the like. In response to the replacement score for an existing IOT device exceeding a predefined threshold, a proposed reconfiguration related to potential removal of the existing IOT device from the network can be transmitted to a user. Alternatively, the existing IOT device can be automatically removed from the smart environment.

When a new IOT device is added to an existing system, device addition module 94 can communicate with the intelligence knowledge corpus (i.e., housed in device database 84) to identify any functionality overlap caused from the addition of the new IOT device among the existing devices in the network. Functionality overlap can be determined by a comparison of product attribute data, user interaction patterns, captured commands, etc. Device addition module 94 can further determine a performance level (e.g., error rate, fault rate, response time, successful usage, etc.) for each device in the network. For example, assume two voice assistant devices (A and B) are purchased and placed in a home. Performance data is captured indicating a 5% failure rate due to poor audio/voice comprehension. A second generation voice assistant device (C) is introduced to the smart home at a later time. Performance data for device C indicates a 98% success rate due to better voice comprehension. Device addition module 94 determines the first generation device should be replaced with the second generation device due to its better performance which can reduce duplicate queries 60% of the time. If performance data indicates the new IOT device operates less efficiently than the existing device, then device addition module 94 determines the first generation device should not be replaced.

Figure 3:
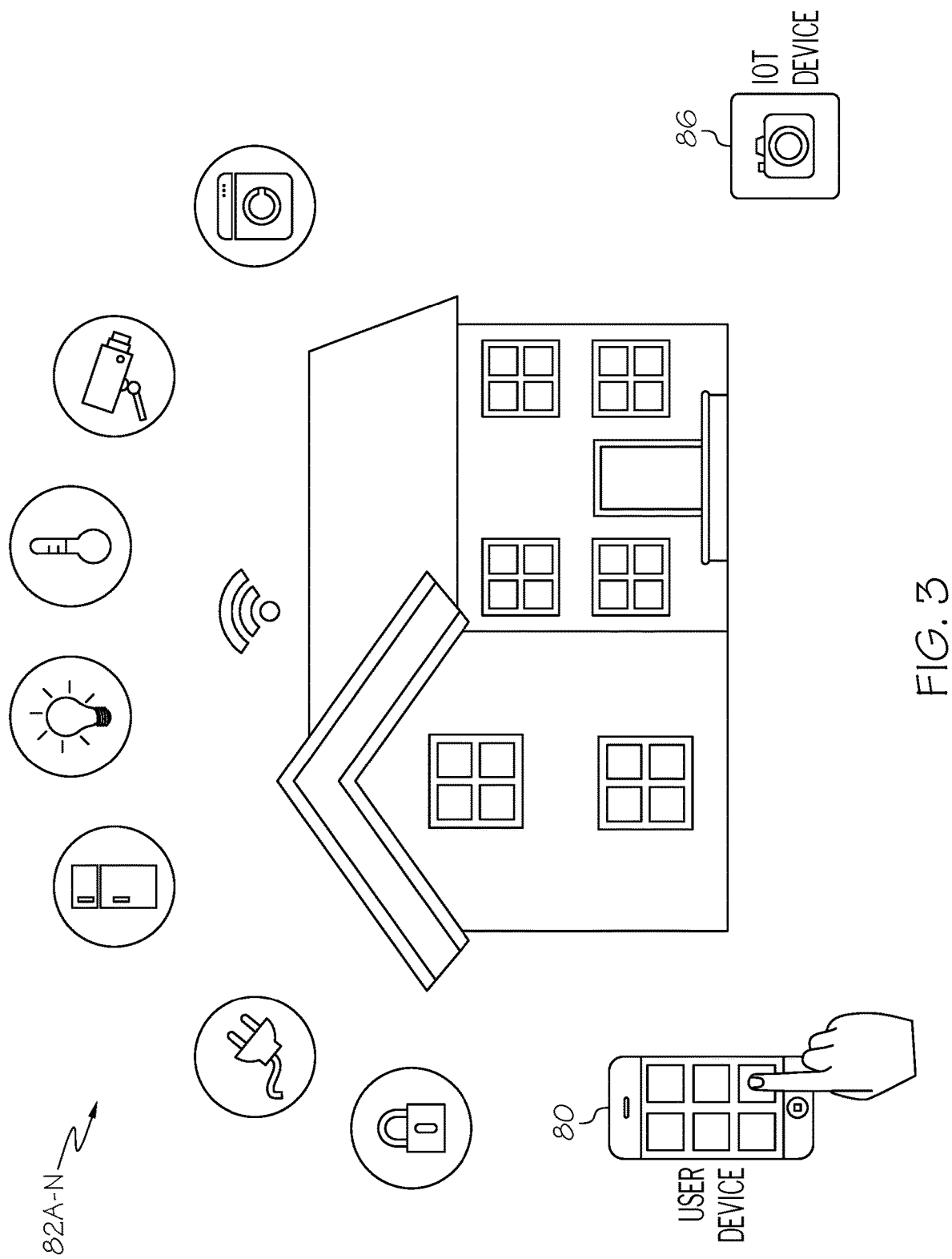
FIG. 3 depicts an example smart home environment according to an embodiment of the present invention.

FIG. 3 shows an example smart home environment according to an embodiment of the present invention. As shown, the depicted smart home configuration includes multiple IOT devices 82A-N. One of those IOT devices is a smart camera having moderate resolution placed in a room of the home. Product attribute information along with performance data of the smart camera has been collected in device database 84. The smart camera is configured to capture a user gesture and execute an IOT action based on the gesture. Further assume a new IOT device 86 has been introduced to the same room, and the new device 86 includes a camera feature having a higher resolution than the existing camera and can also capture user gestures and perform the IOT action. Based on this, device addition module 94 identifies a functionality redundancy or overlap among the IOT devices. Once introduced, product attribute information is collected/stored for IOT device 86. Further, performance data begins to be collected/stored for the new device 86.

Once an IOT functionality redundancy is detected, device addition module 94 continues monitoring performance of existing devices and begins monitoring performance data for the newly added IOT device 86 for a predefined amount of time (e.g., two days, one week, etc.) to determine whether the new device 86 or the existing IOT smart camera performs the particular function more efficiently. For example, device addition module 94 can compare a failure rate of gesture attempts for the existing device and against that of the newly introduced IOT 86 device having the camera/gesture capture feature. If the new IOT device 86 performs the function more consistently than an existing device, then user might prefer the new IOT device 86 begin performing that function rather than the existing IOT device. If that is the only function the existing IOT device can perform, then the device itself may no longer be necessary or can act as a backup to the new device. If the existing device can perform other functions as well, then the device can continue performing these functions within the network.

In response to the replacement score for an existing IOT device exceeding a predefined threshold, a proposed reconfiguration of the existing intelligent system related to potential removal of the existing IOT device from the network can be transmitted to a user. Alternatively, the existing IOT device can be automatically removed from the smart environment.

In another embodiment, when a new IOT device is added to an intelligent system, device addition module 94 can identify whether a particular IOT device or functionality of the device is redundant based on the introduction of the new device and can recommend a repositioning of any number of devices within the location (e.g., the smart home). For example, assume an IOT music system having a compact disc (CD) player, radio, and karaoke functions with high quality audio is added to a front room of a home as part of a smart home system. The existing system includes a previously added CD player and radio. The CD player has been kept in the front room but is frequently moved to a bedroom so that the user can play music there. Device addition module 94 can recommend the CD player be repositioned to the bedroom since the CD player function is no longer needed in the front room of the home.

In another embodiment, device addition module 94 can communicate with the intelligence knowledge corpus to identify any existing problem or issue in the smart system that can be solved by the new device. For example, Brand A voice assistant exists in a home. A user frequently asks, "How does traffic look around this area?" Brand A voice assistant reads the user a traffic report but cannot show the user as the voice assistant does not have a visual interface. The user introduces Brand B voice assistant to the smart environment, which does contain a visual interface. The user asks the question again. Device addition module 94 determines that the Brand B voice assistant can be used to show the traffic visually. As discussed below, a proposed reconfiguration of the existing intelligent system can be provided to the user. For example, a notification stating, "Your query is heavily associated with a visual component, please replace the Brand A voice assistant with the Brand B voice assistant so that you may see the traffic conditions" can be transmitted to the user. Device addition module 94 recognizes that the user is seeking a capability that the Brand A device doesn't have, but the Brand B device does.

In another example, assume a user purchases a smart light bulb, but it can only turn on and off. The user says, "Smart home, dim the lights in the bedroom". The smart bulb is not capable of doing that. When a smart dimmable light bulb is introduced to the home, device addition module 94 recognizes this capability and can provide an installation recommendation of the dimmable bulb in the bedroom when the request to dim the lights is made again.

In yet another embodiment, device addition module 94 may be configured to query a user for additional information when a new IOT device has been added to an existing network in order to resolve an existing problem and/or perform a particular activity. When analyzing the problem or activity, device addition module 94 can verify whether the knowledge corpus includes sufficient information to resolve the issue or perform the activity. If not, device addition module 94 can ask for additional information from the user to update the knowledge corpus for the newly added device. For example, a user installs a new Bluetooth dimmable light bulb to a smart ecosystem in a bedroom. There are four lights in the bedroom. Device addition module 94 recognizes that the user can dim lights in the bedroom, but only one of four. The smart home system can notify the user, "You have partial capability to dim lights. What do you want me to do with the others?".

Reconfiguration module 96 of system 72, as executed by computer system/server 12, is configured to generate a proposed reconfiguration of an existing intelligent system based on a detected functionality redundancy caused by an introduction of a new IOT device in an existing intelligent system. For example, various devices can have a same or similar functionality. Further, a device can perform a particular function more efficiently or with better performance than a different device (e.g., the camera example above). Activities among the different devices can be reassigned or the devices themselves can be repositioned based on the functions and performance of a newly introduced IOT device within an existing network. For example, a newly purchased smart combination washing/drying machine is added to an existing system and has washing and 100% drying capability, so that a previously added smart clothes dryer may no longer be necessary. Similarly, a newly purchased smart music system having high quality audio can necessitate moving an existing music device to a different location if music in the different location is desired.

A proposed configuration can be transmitted to a user via a notification. Notification can be provided to a user via user device 80 (e.g., smart phone, tablet, laptop, etc.) configured for use with an IOT environment. In an embodiment, a notification regarding a functionality redundancy can appear on a mobile device (e.g., text message, push notification, email, etc.) associated with a user of the smart network. For example, in the camera example discussed above, the notification might state, "The newly added IOT device can replace the existing camera in reading user gestures." In this case, the user can either remove the existing camera device for use in a different area or, perhaps, use it as a backup to the newly added device in the same area. In the music example above, the notification might direct the user to relocate the CD player to the bedroom where it can be used to play music.

In an embodiment, these functions and/or any other function of system 72 can be performed by a cognitive system, such as IBM's Watson Search or Watson Explorer (IBM is a registered trademark and Watson is a trademark of International Business Machines Corporation).

Figure 4:
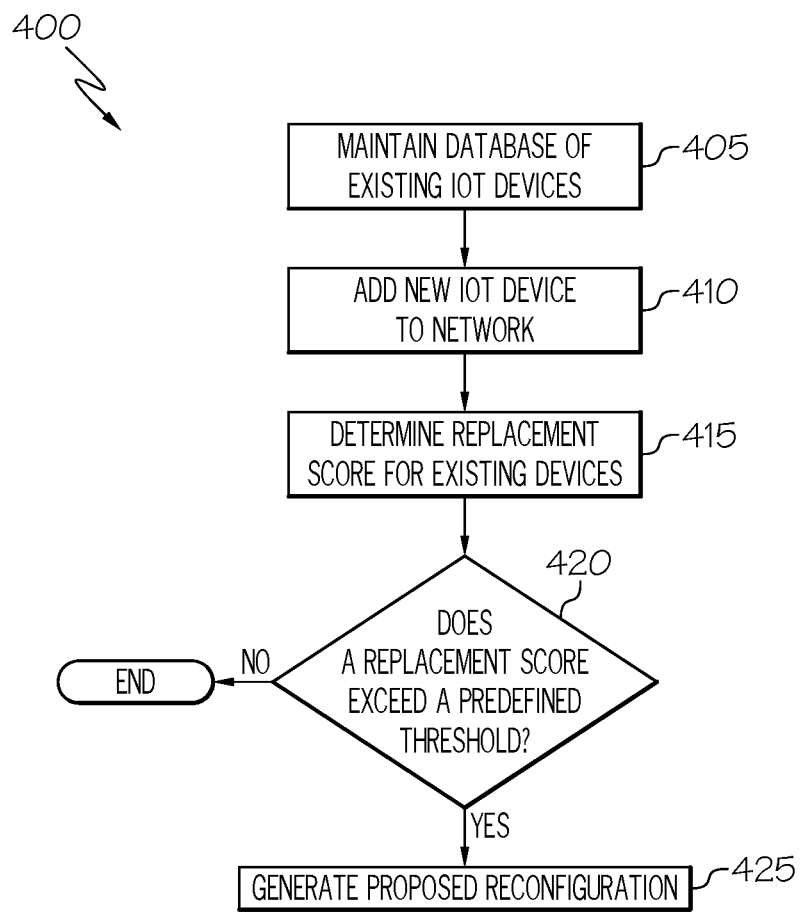
FIG. 4 depicts an example process flowchart according to an embodiment of the present invention.

Referring now to FIG. 4 in conjunction with FIG. 2, a process flowchart 400 according to an embodiment of the present invention is shown. At 405, as discussed, device database 84 is maintained of existing IoT devices connected to a network. The database includes device capabilities and monitored performance of each device. Device input module 90 of system 72, as executed by computer system/server 12, is configured to receive/store product attribute data for each IOT device in the intelligent system. Device monitor module 92 of system 72, as executed by computer system/server 12, is configured to monitor/store performance data of each IOT device in the smart system. This data is maintained in device database 84.

At 410, a new IOT device is introduced into the existing smart environment. Once introduced, at 415, device addition module 94 of system 72, as executed by computer system/server 12, is configured to generate a replacement score for each existing IOT device. The replacement score for a given existing IOT device can indicate: (i) an amount of overlapping capabilities between the existing IOT device and the new IOT device, (ii) an amount of additional capabilities of the new IOT device over the existing IOT device, (iii) an amount of performance improvement of the new IOT device over the existing IOT device, and/or the like. At 420, replacement scores for existing IOT devices are compared against a predefined threshold. If a replacement score exceeds the threshold, a proposed recommendation of the existing intelligent system can be provided to a user, at 425. For example, a notification can be transmitted to the user indicating possible removal of the existing device from the system.

The process flowcharts of FIGS. 6 and 7 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for dynamically adapting an IOT device in an existing intelligent system, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for dynamically adapting an IOT device in an existing intelligent system. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for dynamically adapting an IOT device in an existing intelligent system. In this case, a computer infrastructure, such as computer system 12 (FIG. 1), can be provided and one or more systems for performing the processes of the invention can be captured (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for dynamically adapting an IOT device in an existing intelligent system. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for dynamically adapting an Internet of Things (TOT) device in an existing intelligent system, comprising:
   receiving, upon introduction of a new TOT device to the intelligent system, product attribute data of the new TOT device, each TOT device of the plurality of the TOT devices performing at least one function of a plurality of functions performed by the intelligent system;
   monitoring, for a predefined amount of time, performance data of the new TOT device, the performance data including actual fault tolerances, error rates, usage patterns, execution logs, outputs, and data that measures performance of each of a set of functions performed by the new TOT device;
   generating, in response to an expiration of the predefined amount of time, a replacement score for the existing TOT device that is based on a comparison of the product attribute data and performance data maintained in a database for a first function performed by both of an existing TOT device and the new TOT device, and that indicates an amount of overlapping capabilities between the existing TOT device and the new TOT device, an amount of additional capabilities of the new TOT device over the existing TOT device, and an amount of performance improvement of the new TOT device over the existing TOT device in performing the first function; and
   generating, when the replacement score corresponding to the first function for the existing TOT device exceeds a predefined threshold, a proposed reconfiguration of the existing intelligent system in which the new TOT device replaces that existing TOT device in performing the first function.

2. The computer-implemented method of claim 1, wherein the proposed reconfiguration includes automatic removal of the existing IOT device from the intelligent system for future performance of the first function, such that the new IOT device performs the first function and the existing IOT device acts as a backup to the new IOT device.

3. The computer-implemented method of claim 1, further comprising storing the product attribute data and performance data of the new IOT device in the database.

4. The computer-implemented method of claim 1, wherein the replacement score includes an amount of overlapping capabilities between the existing IOT device and the new IOT device.

5. The computer-implemented method of claim 1, wherein the replacement score includes an amount of additional capabilities of the new IOT device over the existing IOT device.

6. The computer-implemented method of claim 3, wherein the proposed reconfiguration includes the existing IOT device continuing to perform a second function that the existing IOT device had previously been performing when the replacement score corresponding to the second function for the existing IOT device does not exceed the predefined threshold.

7. The computer-implemented method of claim 1, wherein the proposed reconfiguration includes a recommendation for a repositioning of the existing TOT device to a different physical location.

8. A computer system for dynamically adapting an TOT device in an existing intelligent system, the computer system comprising:
   a memory medium comprising program instructions;
   a bus coupled to the memory medium; and a processor for executing the program instructions, the instructions causing the system to:
receive, upon introduction of a new TOT device to the intelligent system, product attribute data of the new TOT device, each TOT device of the plurality of the TOT devices performing at least one function of a plurality of functions performed by the intelligent system;
monitor, for a predefined amount of time, performance data of the new TOT device, the performance data including actual fault tolerances, error rates, usage patterns, execution logs, outputs, and data that measures performance of each of a set of functions performed by the new TOT device;
generate, in response to an expiration of the predefined amount of time, a replacement score for the existing TOT device that is based on a comparison of the product attribute data and performance data maintained in a database for a first function performed by both of an existing TOT device and the new TOT device, and that indicates an amount of overlapping capabilities between the existing TOT device and the new TOT device, an amount of additional capabilities of the new TOT device over the existing TOT device, and an amount of performance improvement of the new IOT device over the existing IOT device in performing the first function; and
generate, when the replacement score corresponding to the first function for the existing IOT device exceeds a predefined threshold, a proposed reconfiguration of the existing intelligent system.

9. The computer system of claim 8, wherein the proposed reconfiguration includes automatic removal of the existing IOT device from the intelligent system for future performance of the first function, such that the new IOT device performs the first function and the existing IOT device acts as a backup to the new IOT device.

10. The computer system of claim 8, the instructions further causing the system to store the product attribute data and performance data of the new IOT device in the database.

11. The computer system of claim 8, wherein the replacement score includes an amount of overlapping capabilities between the existing IOT device and the new IOT device.

12. The computer system of claim 8, wherein the replacement score includes an amount of additional capabilities of the new IOT device over the existing IOT device.

13. The computer system of claim 10, wherein the proposed reconfiguration includes the existing IOT device continuing to perform a second function that the existing TOT device had previously been performing when the replacement score corresponding to the second function for the existing TOT device does not exceed the predefined threshold.

14. The computer system of claim 8, wherein the proposed reconfiguration includes a recommendation for a repositioning of the existing TOT device to a different physical location.

15. A computer program product embodied in a computer readable storage medium that, when executed by a computer device, performs a method for dynamically adapting an Internet of Things (TOT) device in an existing intelligent system, the method comprising:
receiving, upon introduction of a new TOT device to the intelligent system, product attribute data of the new TOT device, each TOT device of the plurality of the TOT devices performing at least one function of a plurality of functions performed by the intelligent system;
monitoring, for a predefined amount of time, performance data of the new TOT device, the performance data including actual fault tolerances, error rates, usage patterns, execution logs, outputs, and data that measures performance of each of a set of functions performed by the new TOT device;
generating, in response to an expiration of the predefined amount of time, a replacement score for the existing TOT device that is based on a comparison of the product attribute data and performance data maintained in a database for a first function performed by both of an existing TOT device and the new TOT device, and that indicates an amount of overlapping capabilities between the existing TOT device and the new TOT device, an amount of additional capabilities of the new IOT device over the existing IOT device, and an amount of performance improvement of the new IOT device over the existing IOT device in performing the first function; and
generating, when the replacement score corresponding to the first function for the existing IOT device exceeds a predefined threshold, a proposed reconfiguration of the existing intelligent system.

16. The program product of claim 15, wherein the proposed reconfiguration includes automatic removal of the existing IOT device from the intelligent system for future performance of the first function, such that the new IOT device performs the first function and the existing IOT device acts as a backup to the new IOT device.

17. The program product of claim 15, further comprising storing the product attribute data and performance data of the new IOT device in the database.

18. The program product of claim 15, wherein the replacement score includes an amount of overlapping capabilities between the existing IOT device and the new IOT device.

19. The program product of claim 15, wherein the replacement score includes an amount of additional capabilities of the new IOT device over the existing IOT device.

20. The program product of claim 17, wherein the proposed reconfiguration includes the existing IOT device continuing to perform a second function that the existing TOT device had previously been performing when the replacement score corresponding to the second function for the existing TOT device does not exceed the predefined threshold.

* * * * *